US007804785B2

(12) United States Patent
Roberts et al.

(10) Patent No.: US 7,804,785 B2
(45) Date of Patent: Sep. 28, 2010

(54) NETWORK SYSTEM HAVING AN INSTRUCTIONAL SEQUENCE FOR PERFORMING PACKET PROCESSING AND OPTIMIZING THE PACKET PROCESSING

(75) Inventors: Dave Roberts, Fremont, CA (US); Jeffrey Stuart Hansell, Fremont, CA (US); Praveen Ghanashyam Shekokar, Sunnyvale, CA (US)

(73) Assignee: Avaya Inc., Basking Ridge, NJ (US)

( * ) Notice: Subject to any disclaimer, the term of this patent is extended or adjusted under 35 U.S.C. 154(b) by 2952 days.

(21) Appl. No.: 10/126,209

(22) Filed: Apr. 19, 2002

(65) Prior Publication Data

US 2003/0198189 A1    Oct. 23, 2003

(51) Int. Cl.
*H04L 12/28* (2006.01)
*H04L 12/56* (2006.01)
(52) U.S. Cl. .................. 370/252; 370/351; 709/238
(58) Field of Classification Search ............... 370/252, 370/351, 392, 394, 400, 401; 709/238–242
See application file for complete search history.

(56) References Cited

U.S. PATENT DOCUMENTS

| 5,051,987 A | 9/1991 | Conlon |
| 5,481,735 A | 1/1996 | Mortensen et al. |
| 5,526,414 A | 6/1996 | Bédard |
| 5,550,816 A | 8/1996 | Hardwick et al. |
| 5,577,028 A | 11/1996 | Chugo et al. |
| 5,583,862 A | 12/1996 | Callon |
| 5,592,622 A | 1/1997 | Isfeld et al. |
| 5,598,410 A | 1/1997 | Stone |
| 5,636,371 A | 6/1997 | Yu |
| 5,684,800 A | 11/1997 | Dobbins et al. |
| 5,764,736 A | 6/1998 | Shachar et al. |
| 5,781,624 A | 7/1998 | Mitra et al. |
| 5,805,587 A | 9/1998 | Norris et al. |
| 5,809,025 A | 9/1998 | Timbs |
| 5,852,607 A | 12/1998 | Chin |
| 5,917,899 A | 6/1999 | Moss et al. |
| 5,918,074 A | 6/1999 | Wright et al. |
| 6,041,058 A | 3/2000 | Flanders et al. |
| 6,046,979 A | 4/2000 | Bauman |
| 6,047,320 A | 4/2000 | Tezuka et al. |
| 6,047,330 A | 4/2000 | Stracke, Jr. |
| 6,055,618 A | 4/2000 | Thorson |

(Continued)

OTHER PUBLICATIONS

PCT US03/07868, Mar. 14, 2003, International Search Report.

(Continued)

*Primary Examiner*—William Trost, IV
*Assistant Examiner*—Roberta A Shand
(74) *Attorney, Agent, or Firm*—Chapin IP Law, LLC; David W. Rouille, Esq.

(57) ABSTRACT

A method, apparatus, and system in which a network system has one or more individual networks. The topology of the first individual network includes two or more service modules. At least one of the service modules is modeled to represent a network element that performs one or more functions to process a packet in a network system. The two or more service modules may be arranged in the first individual network in an arbitrary topology. The packet processing by the two or more service modules is governed by the topology of the first individual network.

12 Claims, 19 Drawing Sheets

U.S. PATENT DOCUMENTS

| | | | |
|---|---|---|---|
| 6,061,723 A * | 5/2000 | Walker et al. | 709/224 |
| 6,069,895 A | 5/2000 | Ayandeh | |
| 6,085,238 A | 7/2000 | Yuasa et al. | |
| 6,101,181 A | 8/2000 | Passint et al. | |
| 6,104,699 A | 8/2000 | Holender et al. | |
| 6,104,962 A | 8/2000 | Sastry | |
| 6,108,689 A | 8/2000 | Fagen et al. | |
| 6,172,990 B1 | 1/2001 | Deb et al. | |
| 6,178,183 B1 | 1/2001 | Buskirk, Jr. | |
| 6,178,453 B1 | 1/2001 | Mattaway et al. | |
| 6,185,213 B1 | 2/2001 | Katsube et al. | |
| 6,212,560 B1 | 4/2001 | Fairchild | |
| 6,377,571 B1 | 4/2002 | Tai | |
| 6,473,405 B2 * | 10/2002 | Ricciulli | 370/238 |
| 6,594,268 B1 * | 7/2003 | Aukia et al. | 370/400 |
| 6,807,581 B1 * | 10/2004 | Starr et al. | 709/250 |
| 2001/0037397 A1 | 11/2001 | Boucher et al. | |
| 2002/0069369 A1 | 6/2002 | Tremain | |
| 2002/0089937 A1 * | 7/2002 | Venkatachary et al. | 370/255 |
| 2003/0069973 A1 * | 4/2003 | Ganesan et al. | 709/226 |

OTHER PUBLICATIONS

Inkra Networks, "New Data Center Architecture from Inkra Networks Enables Dedicated Services with Shared Economics," Press Release, Feb. 19, 2002, pp. 1-4, http.//www.inkra.com/news_events/pressy/pr2002-02-19C.html.

Inkra Networks, "Inkra Hardwall: A Technology Overview," Feb. 2002, pp. 1-7, Fremont, CA, USA.

Inkra Networks, "Inkra 4000 Virtual Service Switch Architecture," Jul. 18, 2002, pp. 3-12, Inkra Networks Corp., Fremont, CA, USA.

Inkra Networks, "Service Providers Bullish on Inkra Networks' New Data Center Architecture," Press Release, Feb. 19, 2002, pp. 1-2, http.//www.inkra.com/news_events, Inkra Networks Corp., Fremont, CA, USA.

Inkra Networks, "New Data Center Architecture Scales Multi-Tier Enterprise Applications While Slashing Data Center Cost and Complexity" Press Release, Feb. 19, 2002, pp. 1-2, http.//www.inkra.com/news_events.

* cited by examiner

| Mnemonic | Description |
|---|---|
| Illegal | Illegal Primitive |
| NOP | No Operation |
| CHK_DM | Check Destination MAC Address Match |
| TX_ENDP | Transmit the Message and End Processing |
| TXSP_ENDP | Send the Message to Slow Path and End Processing |
| DEL_ENDP | Delete the Message and End Processing |
| FIP_NAT | Full IP NAT |
| SIP_NAT | Source IP NAT |
| DIP_NAT | Destination IP NAT |
| FTU_PAT | Full TCP/UDP PAT |
| STU_PAT | Source TCP/UDP PAT |
| DTU_PAT | Destination TCP/UDP PAT |
| ADD_SEQNUM | TCP Sequence Number Update |
| ADD_ACKNUM | TCP Acknowledgement Number Update |
| TWSZ_ADJ | TCP Window Size Adjust |
| CMP_TDSZ | Compare TCP Data size |
| CMP_ACKNUM | Compare TCP Ack Number |
| CMP_ACKWIN | Compare TCP Ack Window |
| CMP_SEQNUM | Compare TCP Seq Number |
| CMP_SEQWIN | Compare TCP Seq Window |
| INC_IPCS | Incremental IP CheckSum |
| INC_TCS | Incremental TCP CheckSum |
| INC_UCS | Incremental UDP CheckSum |
| DEC_TTL | Decrement TTL |
| CMP_IPHLEN | Compare IP Header Length |
| OW_DMAC | Overwrite Destination MAC Address |
| OW_SMAC | Overwrite Source MAC Address |
| OW_ET | Overwrite Ether Type |
| Unsupported | Unsupported Primitives. Would be treated as Illegal |
| Dup | Duplicate Packet |
| Cond | Conditional Primitive If/OR/AND |

Figure 7

| Index | Operation | Description |
|---|---|---|
| Firewall Functionality | | |
| 1 | CMP_IPHLEN | Compare IP header length with what we expect. If it isn't what we expect, there may be some sort of strange security attack going on. |
| 2 | DIP_NAT | Change the destination address to something in the private address space (10.x.x.x) used by the server farm. In this case, the new IP address will be the virtual IP address used for the load balancer server pool following. The exact mapping is determined by the firewall server export rules. |
| 3 | DTU_PAT | Destination port translation, in case the server is running the service on a different port. For instance, the incoming request might be for HTTP running on standard port 80. We may change this to port 8080 on the server for security. |
| 4 | INC_TCS | Incremental TCP checksum update after NAT and PAT. |
| 5 | INC_IPCS | Incremental IP checksum update NAT and PAT. |
| Layer 7 Load Balancer Functionality | | |
| 6 | FIP_NAT | Perform full NAT (source and destination address) as first part of TCP splicing. Change source address to that used by the load balancer and destination address to the real server IP address. |
| 7 | FTU_PAT | Perform full PAT as part of TCP splicing. |
| 8 | ADD_SEQNUM | Adjust the TCP sequence number as part of TCP splicing. |
| 9 | ADD_ACKNUM | Adjust the TCP acknowledgement number as part of TCP splicing. |
| 10 | INC_TCS | Update the TCP checksum after performing TCP splicing. |
| 11 | INC_IPCS | Update the IP checksum after performing TCP splicing. |

Figure 9a

| Router Functionality | | |
|---|---|---|
| 12 | CHK_DM | Check that the MAC address matches the router's interface address. |
| 13 | CMP_IPHLEN | Check the IP header length to make sure there are no IP options that we need to deal with. |
| 14 | DEC_TTL | Decrement the IP TTL field and throw away the packet if it goes to zero. |
| 15 | INC_IPCS | Update the IP checksum after adjusting the TTL field. |
| 16 | OW_DMAC | Update the Ethernet destination MAC address with the next-hop MAC address. |
| 17 | OW_SMAC | Change the Ethernet source MAC address to that of the router. |
| 18 | TX_ENDP | End processing and transmit the packet. |

Figure 9B

| Rule | | Before | After |
|---|---|---|---|
| 1 | Source NAT or Destination NAT can be merged with a subsequent Full NAT to produce a modified Full NAT operation with different NAT parameters. | DIP_NAT<br><br>FIP_NAT | FIP_NAT |
| 2 | All Full NAT operations other than the last can be deleted. | FIP_NAT<br><br>FIP_NAT | FIP_NAT |
| 3 | A Destination NAT operation and a Source NAT operation can be merged to produce a full NAT operation | DIP_NAT<br><br>SIP_NAT | FIP_NAT |
| 4 | Source PAT or Destination PAT can be combined with Full PAT operations to produce a modified Full PAT operation with different PAT parameters. | DTU_PAT<br><br>FTU_PAT | FTU_PAT |
| 5 | Full PAT operations can be merged into single full PAT operation. | FTU_PAT<br><br>FTU_PAT | FTU_PAT |
| 6 | A Destination PAT operation and a Source PAT operation can be merged to produce a full PAT operation | DTU_PAT<br><br>STU_PAT | FTU_PAT |
| 7 | Incremental TCP checksum updates can be merged into a single TCP checksum update with a combined differential. | INC_TCS<br><br>INC_TCS | INC_TCS |
| 8 | Incremental IP checksum updates can be merged into a single IP checksum update with a combined differential. | INC_IPCS<br><br>INC_IPCS | INC_IPCS |

| Sequence | High-Level DSM | | Low-Level Primitive |
|---|---|---|---|
| 1 | Firewall 1150 | 1152 | 1. Null, once the flow is admitted |
| 2 | Layer 7 SLB 1154 | 1156 | 2a. TCP Splicing<br><br>2b. TCP Checksum recalculation<br><br>2c. IP Checksum recalculation |
| 3 | Prioritization 1158 | 1160 | 3a. DiffServ code point alteration<br><br>3b. IP Checksum recalculation |
| 4 | Final Routing 1162 | 1164 | 4a. IP TTL decrement<br><br>4b. IP Checksum recalculation<br><br>4c. MAC reframing |

| Sequence | High-Level DSM | Low-Level Primitive |
|---|---|---|
| 1 | Firewall | |
| 2 | Layer 7 SLB | 2a. TCP Splicing |
| 3 | Prioritization | 3a. DiffServ code point alteration |
| 4 | Final Routing | 4a. IP TTL decrement<br><br>2b. TCP Checksum recalculation<br><br>4b. IP Checksum recalculation<br><br>4c. MAC reframing |

NETWORK SYSTEM HAVING AN INSTRUCTIONAL SEQUENCE FOR PERFORMING PACKET PROCESSING AND OPTIMIZING THE PACKET PROCESSING

NOTICE OF COPYRIGHT

A portion of the disclosure of this patent document contains material that is subject to copyright protection. The copyright owner has no objection to the facsimile reproduction by anyone of the software engines and modules, as they appears in the Patent and Trademark Office Patent file or records, but otherwise reserves all copyright rights whatsoever.

FIELD OF THE INVENTION

This invention generally relates to a network system. More particularly an aspect of this invention relates to a network system employing an instructional sequence for performing packet processing and optimizing the processing of a packet in the network system.

BACKGROUND OF THE INVENTION

A typical standard networking system implemented single-function, fixed functionality per network element. Even, the first generation of virtualized systems offers per-customer functionality, but the functionality is still fixed per network element. These limitations lead to several drawbacks. Customers may judge service providers based on service availability, bandwidth, and quality of service. Each individual network element must take the time and resources to make a decision on how to process an incoming data packet. Service availability, bandwidth, and quality of service may be adversely affected by the more combined time and combined resources it takes to process packet throughout the entire network.

FIG. 1 illustrates a typical network system. The network system 100 includes an outside network such as Internet 101, a plurality of network servers 103 and individual network elements, such as a firewall 104, a load balancer 105, a traffic manager 106, and a router 107. The network elements 104-107 receive data packets from another network system over the Internet 101. The data may be received from a client such as a personal computer. Alternatively, the data may be received from another network environment, such as corporate intranet. The data packets may be packaged in TCP/IP protocol. The network elements 104-107 receive the data; the network elements 104-107 identify the source and the destination of the servers being targeted. The network elements 104-107 process the data packets and distribute the data flow to an appropriate server within the servers 103. In return, one or more servers within the servers 103 process the data packets and respond accordingly. The responses are transmitted from the corresponding servers to the network elements 104-107 which will resolve the destination of the client and transmit the data packets back to the appropriate client over the Internet 101. Multiple servers 103 may share a physical port or IP address; however, a corresponding logical ID identified by the network elements 104-107 may identify each server of the servers 103. It is the network equipments 102 responsibility to resolve the processing and routing of these data packets.

Typically, network systems implement one of two different types of packet processing technique: packet-by-packet processing or fast-path processing.

FIG. 2 illustrates an exemplary flow chart for a network system implementing packet-by-packet processing. In packet-by-packet processing, each packet is processed identically through the main processing algorithm and associated packet-processing components 202.

FIG. 3 illustrates an exemplary flow chart for a network system implementing an architecture and an algorithm for processing a packet in a fast path architecture. Fast-path processing takes the standard packet-by-packet flow and modifies it to add a fast path. 304. In the fast-path processing 304 technique, when a packet is ready to be processed, a check 306 is first done to determine whether the packet needs to be processed on the fast path or on the slow path.

The slow-path processing 302 is similar to the processing performed in the packet-by-packet technique. The slow-path processing 302 is the "full" processing that the packet would receive normally. The slow-path processing 302 examines the packet for various special cases that may exist in the processing algorithm. This examination process takes time and slows down the processing.

In contrast, the fast-path processing 304 is streamlined to eliminate all decision making. The fast-path processing 304 focuses primarily on performing the basic processing algorithm without consideration of any options. In doing so, the logic in the fast-path processing 304 typically runs faster than the logic in the slow-path processing 302. If many packets can be sent through the fast path logic, the overall throughput of the communications equipment improves.

Some types of fast-path processing algorithms employ a stateless decision as to whether to use the slow path processing 302 or fast path processing 304. Simply by examining the packet itself, the decision logic in the check 306 can determine whether the packet is defaulted to slow-path processing.

A good example of this is a standard Internet Protocol router that looks for IP options in the IP header. If no options are found, the packet is sent to the fast path 304 for processing. Packets that contain IP options are sent to the slow path 302 for more extensive examination and processing. However, typically, a network system implementing an architecture and an algorithm for processing a packet in a fast path architecture does not typically optimize the processing of the packet. In network systems simulating pieces of real network equipment, increasing packet processing performance is beneficial.

There are many optimizations that can be performed. For example, Data patterns in a given network are often very stable. While connectionless, packet networks process data in a packet-by-packet fashion. There is often great commonality in processing various packets. In particular, packets often belong to higher-level sessions and flows from these sessions often travel the same paths and receive the same processing in a given node.

SUMMARY OF THE INVENTION

A method, apparatus, and system in which a network system has one or more individual networks. The topology of the first individual network includes two or more service modules. At least one of the service modules is modeled to represent a network element that performs one or more functions to process a packet in a network system. The two or more service modules may be arranged in the first individual network in an arbitrary topology. The packet processing by the two or more service modules is governed by the topology of the first individual network.

BRIEF DESCRIPTION OF THE DRAWINGS

The drawings refer to the invention in which:

FIG. 7 illustrates a table of an exemplary list of a combined list of the amount of primitive operations in an instruction set contained within a single block of logic, such as a generic fast path processing engine.

FIGS. 9a and 9b illustrate a table of exemplary action lists of primitive operations supplied by each Virtual-Service-Module modeling a network element.

FIG. 10 illustrates an a table of an exemplary list of rules the combined action list optimizer applies to combine, remove and reorder individual primitive operations in order to generate fewer individual primitive operations to process a packet through the entire network.

FIG. 11 illustrates a table of exemplary of a combined action list for nodes a packet passes though that includes an exemplary list of primitive operations each node generates to process that packet.

FIG. 12 illustrates the optimized combined action list from FIG. 11 after being executed on by an optimization component.

Figure 1:
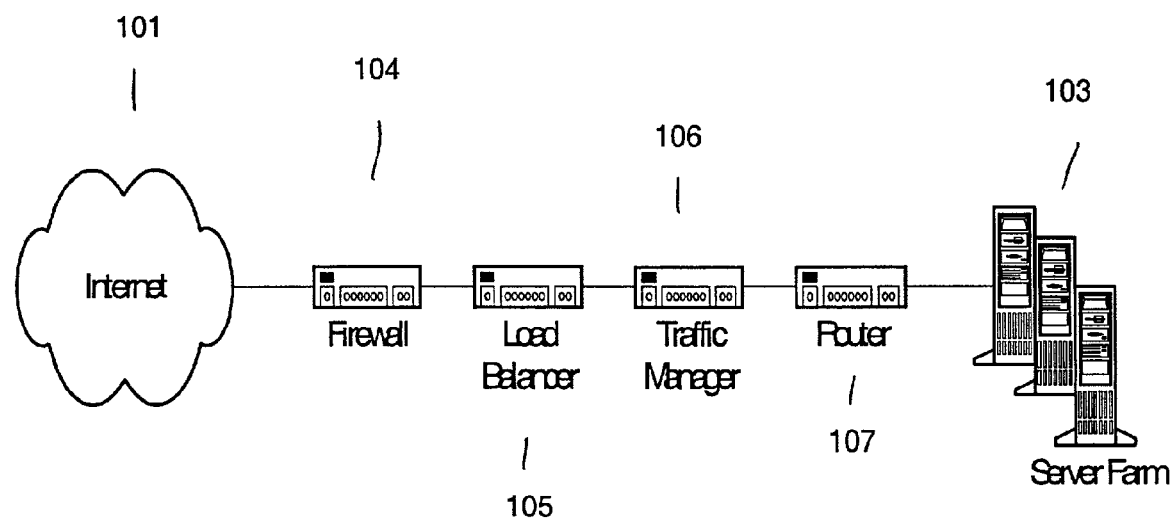
FIG. 1 illustrates a typical network system.
Figure 2:
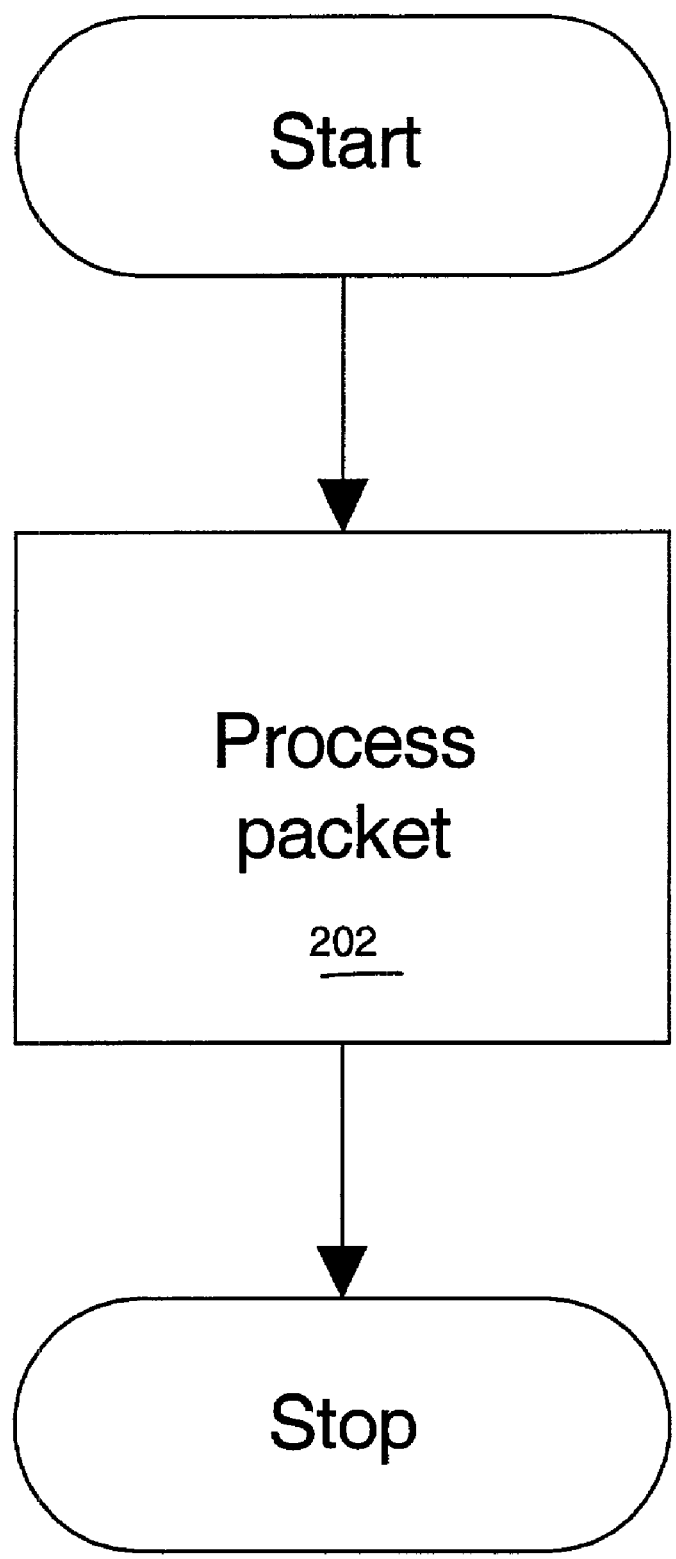
FIG. 2 illustrates an exemplary flow chart for a network system implementing packet-by-packet processing.
Figure 3:
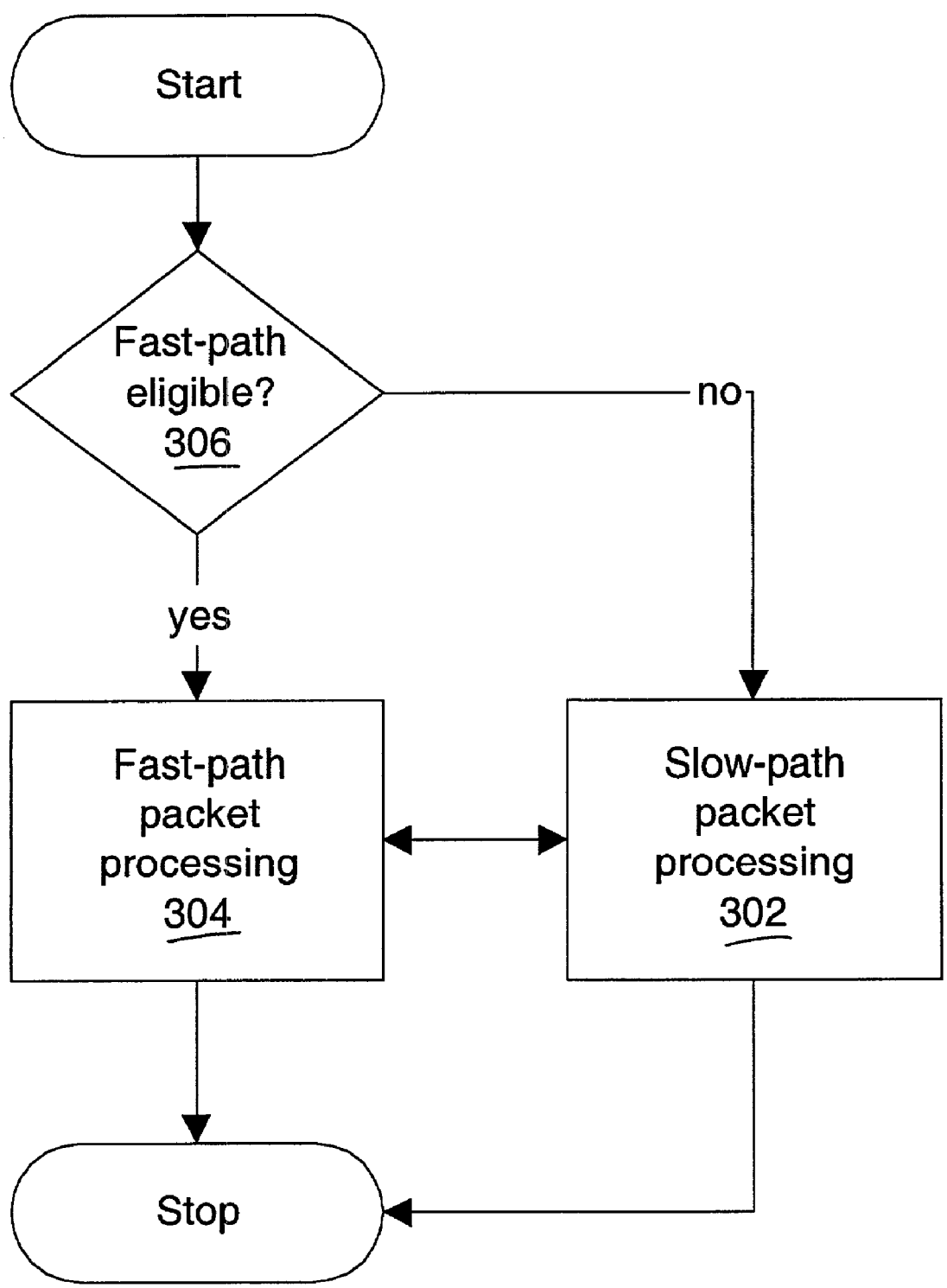
FIG. 3 illustrates an exemplary flow chart for a network system implementing an architecture and an algorithm for processing a packet in a fast path architecture.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of networks, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first driver, may be made. However, the specific numeric reference should not be interpreted as a literal sequential order but rather interpreted that the first Virtual-Service-Module is different than a second Virtual-Service-Module. Thus, the specific details set forth are merely exemplary. The specific details may be varied from and still be contemplated to be within the spirit and scope of the present invention. The term packet may be a block of data used for transmission in packet switched systems. The terms frame, packet and datagram are often used synonymously.

In general, a method, apparatus, and system in which a network system has one or more individual networks. The topology of the first individual network includes two or more service modules. At least one of the service modules is modeled to represent a network element that performs one or more functions to process a packet in a network system. The two or more service modules may be arranged in the first individual network in an arbitrary topology. The packet processing by the two or more service modules is governed by the topology of the first individual network.

Figure 4:
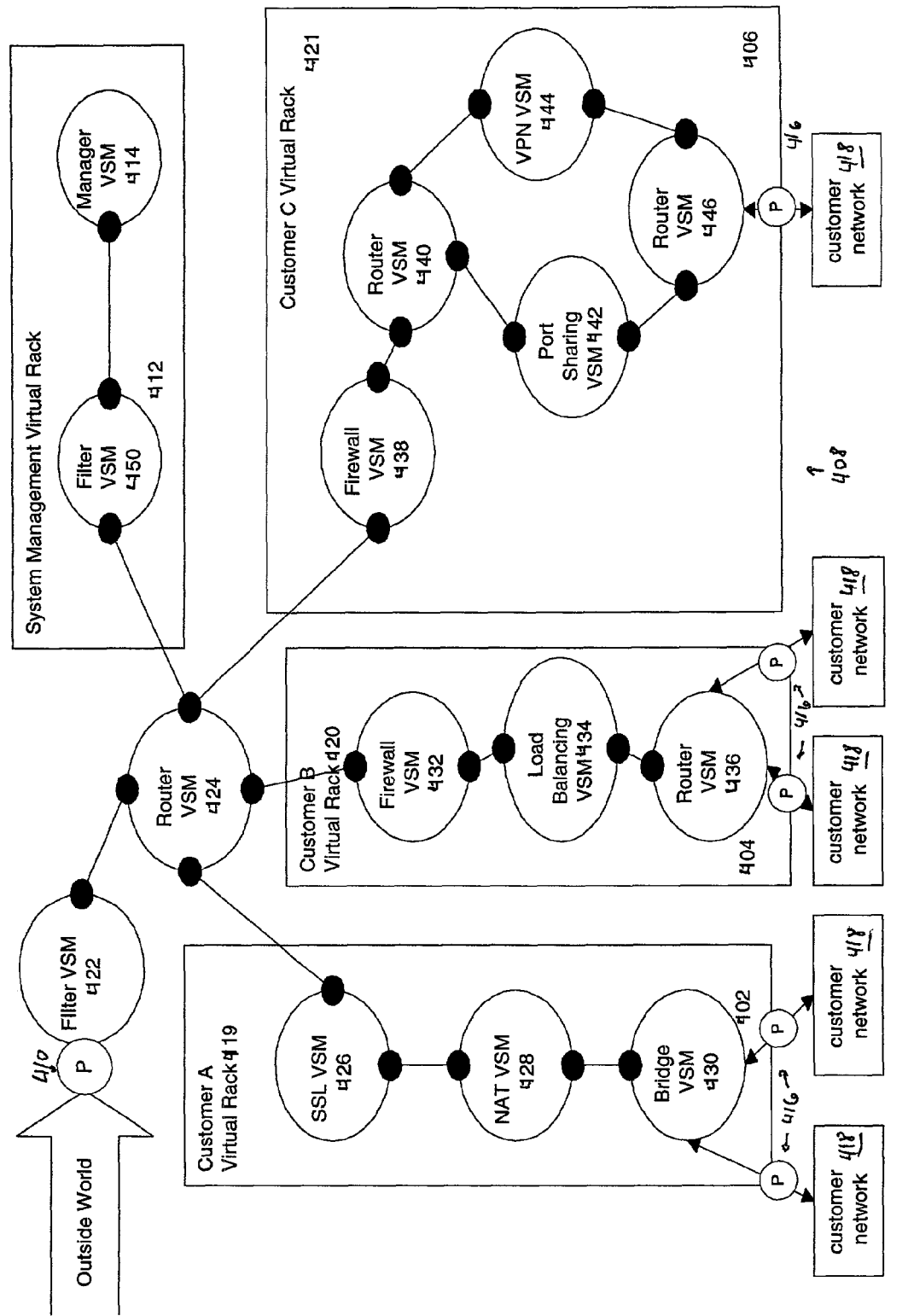
FIG. 4 illustrates an embodiment of a network system that includes multiple individual network topologies implementing an architecture and an algorithm for processing a packet in a fast path architecture.

FIG. 4 illustrates an embodiment of a network system that includes multiple individual network implementing an architecture and an algorithm for processing a packet in a fast path architecture. Further, packet processing in each individual network 402, 404, 406 is governed by the configured graph of Virtual-Service-Modules 422-450 in that individual network 402, 404, 406. The multiple individual network 402, 404, 406 compile into the virtual graph 408 and resources are managed for each individual network in the system according to the user assignment. The network system 400 consists of a first port 410 to the outside world, such as the Internet, a first individual network 402 that includes a first virtual rack 419 housing customer A's network elements, a second individual network 404 that includes a second virtual rack 420 housing customer B's network elements, a third individual network 406 that includes a third virtual rack 421 housing customer C's network elements, a virtual address space assigned to a system management virtual rack 412 housing a management module 414 of the network system, and multiple input output ports 416 connecting the virtual graph 408 to each customer's network 418. In an embodiment, virtual graph houses the topologies of all the individual networks 402, 404, 406 but keeps each individual network logically and physically distinct from each other.

In an embodiment, the virtual graph 400 assigns a separate virtual address space to each individual network 402, 404, 406 within a global domain housing all of the virtual address space. In an embodiment, a virtual rack 419-421 is assigned to each user. The virtual rack 419-421 consists of a virtual address space and hardware resources, such as processing power and memory, dedicated to that virtual address space. The unique address space and dedicated hardware resources of the virtual rack 419-421 makes each individual network 402, 404, 406 logically and physically distinct from another individual network 402, 404, 406. In an embodiment, a virtual rack 419-421 is a logical receptacle for multiple network-resident application services, such as Virtual-Service-Modules, and is analogous to a physical rack of network appliances.

The virtual network topology models the packet-processing functionality in the system as an abstract virtual graph 408 of connected Virtual-Service-Module (VSM) 422-450 nodes. Each Virtual-Service-Module 422-450 in the system is modeled roughly along the lines of individual network elements in the real world. For instance, a Virtual-Service-Module 422-450 may implement functionality approximately that of a standalone IP router, Ethernet switch, a virtual private network, filter/firewall, load balancer, bridge, network address translator, etc. These Virtual-Service-Module 422-450 nodes are then composed in the virtual graph 408 similar to the way they would be in the real world.

Note, the composition and topology of the Virtual-Service-Modules 422-450 modeled to represent network elements may be arbitrarily assembled based upon a particular customer's desires. For example, customer B's network 404 is composed of different network elements than included in the customer C's network 406. Physical ports 410, 416 on a network switch are attached to the virtual graph 408 at various points and allow the internal virtual system to be coupled to components external to the virtual graph 408.

The virtual graph 408 may grow to be very large and come to replace most or all of a typical network data center. The size of the virtual graph 408 may be limited by memory capacity and processing power of the one or more host machines. In an embodiment, the virtual graph 408 is hosted on a single computing machine.

As noted, the network system 400 may have variable functionality representing discrete "services". Each Virtual-Service-Module 422-450 models a network element having one or more functions. In an embodiment, each Virtual-Service-Module 422-450 modeled to represent a network element provides a discrete service.

Each Virtual-Service-Module 422-450 may be composed into the arbitrary topology where packet processing is governed by the configured virtual graph 408 of network services. As each related packet flow is introduced to the system, the support framework software walks the virtual graph of Virtual-Service-Modules in an individual network topology, such as firewall Virtual-Service-Module 432, load balancing Virtual-Service-Module 434, and router Virtual-Service-Module 436, to create a sequential node list for that related packet flow.

As noted, different individual network 402, 404, 406 have reserved resources and the exhaustion of resources for one customer does not affect the service levels seen by a second customer. The physical layer performs resource management at the hardware level to ensure that each individual network 402, 404, 406 receives a guaranteed range of the processing and memory resources available in the system and that each individual network 402, 404, 406 cannot interfere with one another. The unique address space and dedicated physical resources assigned to the virtual rack forms a boundary around the Virtual-Service-Modules 422-450 in each individual network 402, 404, 406. In an embodiment, the physical layer employs HardWall technology created by Inkra Networks, Inc. located in Fremont, Calif. to manage consumption of system resources and to ensure that a disruptive event occurring in one virtual rack does not affect other virtual racks in the same system. Thus, each individual network 402, 404, 406 has processing and memory resources dedicated to that individual network and exhaustion of these dedicated resources for a first individual network is independent from service levels provided to a second individual network.

For example, FIG. 4 shows three separate virtual racks 419-421, each populated with a number of Virtual-Service-Modules 422-450. The physical layer contains resource management circuit, such as a virtual rack processor employing a token bucket algorithm, to ensure that a resource intensive action, such as a Denial of Service attack, launched against virtual rack A 419 does not cause any decrease in performance in virtual rack B 420 beyond guaranteed levels. Virtual rack A 419 can consume only its specified share of resources; past that, the resource management circuit limits any further consumption to ensure that virtual rack B 420 continues to operate normally. Because multiple Virtual-Service-Modules 422-450 can be installed into a virtual rack 419-421, the resource management circuit performs resource management for the entire group of Virtual-Service-Modules within the virtual rack boundaries. This methodology reduces configuration complexity dramatically, because the user is not forced to manually configure resource parameters for each individual Virtual-Service-Module.

In one embodiment, a user may specify or configure the virtual rack 419-421 through a user interface of the management virtual rack 412.

The Virtual-Service-Modules 422-450 in each individual network 402, 404, 406 may be arranged in an arbitrary sequential order. A Virtual-Service-Module modeled to represent a firewall 432 may be placed before or after a Virtual-Service-Module modeled to represent a load balancer 434. Further, customer A's individual network 402 may be composed of different network elements, such as a secure sockets layer 426, a network address translator 428, and a bridge 430, than included in the customer B's individual network 404. Thus, each customer in the virtual graph 408 may tailor the arrangement and functionality of the Virtual-Service-Modules in the individual network 402, 404, 406 associated with that customer to the unique requirements needed by that customer. Further, a customer/user can manage a virtual rack 419-421 populated with one or more Virtual-Service-Module instances 422-450 as a single unit within the network system 400.

There is often great commonality in processing various packets. In particular, packets often belong to higher-level sessions and flows from these sessions often travel the same paths and receive the same processing in a given node. The virtual graph 408 takes advantage of this regularity to optimize the processing of all packets belonging to a given flow. Because packets and information flow through the system based on the an individual network's topology, individual Virtual-Service-Modules 422-450 need not concern themselves with the run-of-the-mill aspects of packet handling. Having received a packet from the support framework software, the Virtual-Service-Modules 422-450 can assume, when appropriate, that the addressing information is correct, that the packet has been correctly demultiplexed, and that the data in the packet is undamaged. Furthermore, most Virtual-Service-Modules 422-450 have no need to make forwarding decisions and can simply pass on any packets after processing them without having to worry about where they go next.

The support framework software may build a sequential node list of Virtual-Service-Modules 422-450. The sequential node list of Virtual-Service-Module is an ordered list of internal nodes through which the packets belonging to a given data stream pass. For instance, FIG. 4 shows a customer's B virtual individual network 404 that may exist inside the virtual graph 408. The packet travels through firewall Virtual-Service-Module 432, load balancing Virtual-Service-Module 434, and router Virtual-Service-Module 436 in this graph of nodes. Because each packet belonging to the flow contains the same data used for routing the packet through the system, each packet takes the same path. The Sequential Node List can be determined by following the packet's progress through the virtual graph 408 as each Virtual-Service-Module processes the packet.

As a packet visits a particular Virtual-Service-Module 422-450, the Virtual-Service-Module determines what sort of processing should be applied to the packet. The processing applied to the packet is described as an ordered list of processing primitive operations called an Action List.

In an embodiment, the system collects the action lists from each node and creates a Combined Action List. The combined action list is the total set of ordered processing primitives contributed by all the nodes the packet visits. Once the system creates the Combined Action List for a particular flow of packets, subsequent packets belonging to the same flow can be processed very quickly. Rather than processing each subsequent packet through the virtual network graph, the system can simply apply the various primitive operations specified by the combined list and pass the transformed packet to the output port specified by the Sequential Node List.

Many different network elements use the same sorts of primitive operations as a part of the processing done by each Virtual-Service-Module 422-450 in the Sequential Node List. For instance, NAT is a common function that may be used by more than one network element in the Node List. TCP splicing will also be popular, as well as TCP/IP checksum recomputation. Certain combinations can be merged into a single operation that encompasses the sum total of two or more individual primitive operations on the single data packet.

Thus, packet processing in the topology of each individual network 402, 404, 406 is governed by the configured graph of Virtual-Service-Modules in that individual network.

Figure 5:
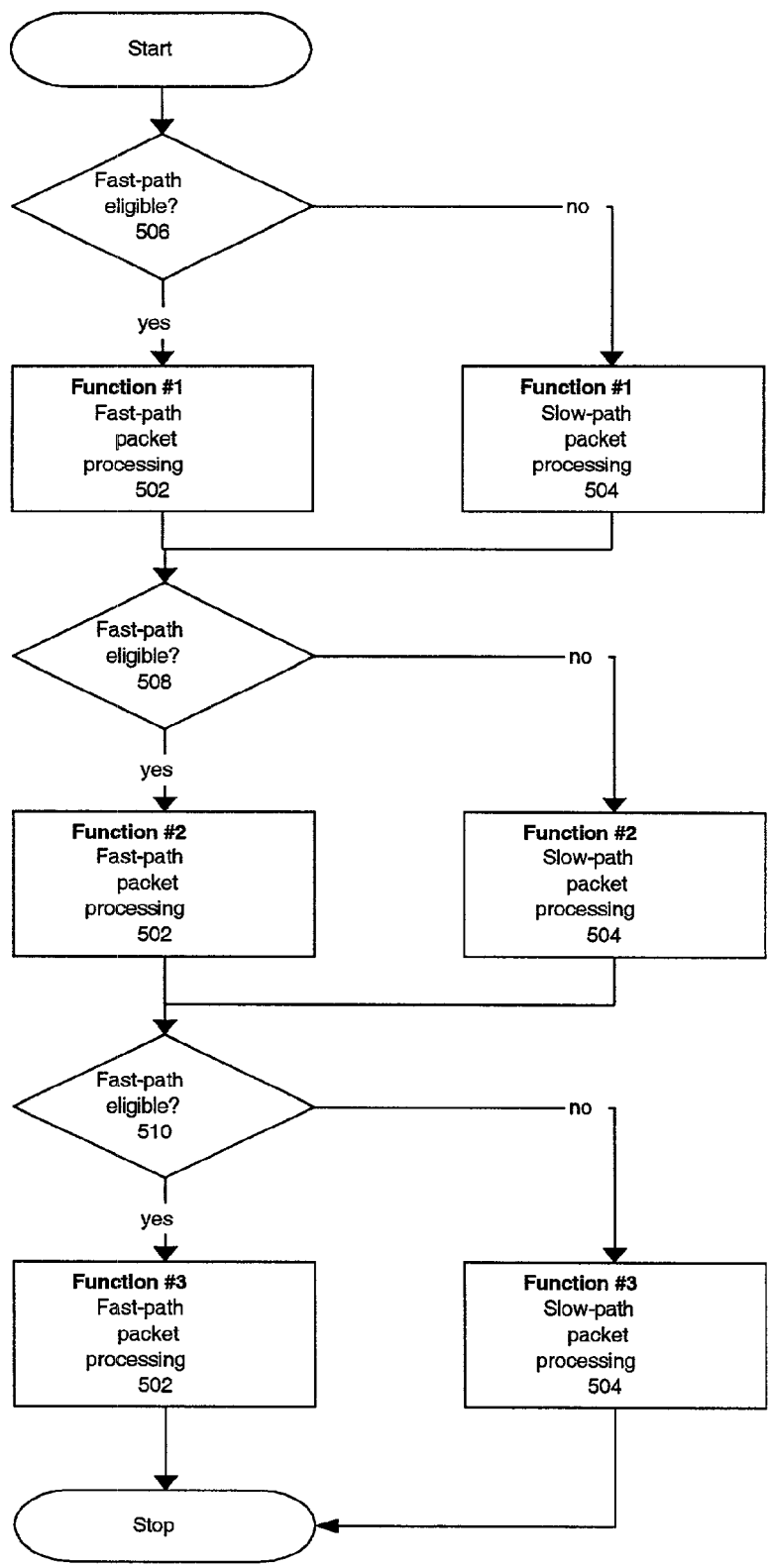
FIG. 5 illustrates flow chart of an embodiment of a first packet processing path limited in its decision making capacity by the amount of primitive operations in an instruction set and a second packet processing path that processes packets that are an exception to the primitive operations in the instruction set.

FIG. 5 illustrates flow chart of an embodiment of a first packet processing path limited in its decision making capacity by the amount of primitive operations in an instruction set and a second packet processing path that processes packets that are an exception to the primitive operations in the instruction set. In this example, decisions and operations are performed on packets from three different network elements in an individual network, such as the firewall Virtual-Service-Module 432, load balancing Virtual-Service-Module 434, and router Virtual-Service-Module 436 in customer's B network 404. The same fast path processing logic 502 processes packets from each discrete network element in a serial manner. The same slow path processing logic 504 processes packets from each discrete network element in a serial manner. Thus, the system uses a common system architecture for processing network traffic but has at least two packet processing path to process packets with.

A first fast-path processing check 506 occurs to see if the packet being processed by the firewall is eligible for fast path processing or required to processed by the slow path. The first fast-path processing check 506 may employ a processing algorithms that has decision logic that is "stateful." The slow path 504 and the fast path 502 communicate state information between themselves and the decision logic in each fast-path processing check 506, 508, 510. As described later, the state information tells the decision logic which packets should be processed on the fast path and it tells the fast path what type of processing should occur. Thus, a first stateful decision may be that the slow path 504 is used to identify the start of a flow of related packets followed by the fast path 502 handling the processing of all subsequent packets in that related flow of packets.

For example, packet flow in a network firewall, such as firewall Virtual-Service-Module 432, often processes packets according to the TCP flow to which the packets belong. All packets belonging to a given flow are processed in the same manner. The packets are either allowed to pass through the firewall or dropped. Initially, all packets are directed to the fast path 502. If the packet is related to a related flow of packets previously identified by the system, then the packet is eligible for fast path processing from the beginning. If not, the slow path 504 processes a packet that begins a previously unidentified related flow of packets. The slow path determines whether the flow should be allowed to pass or be dropped and sends this information to the fast path 502. The slow path also provides the decision logic in the fast-path processing checks 506, 508, 510 with a characterization of the flow so that the decision logic can recognize the flow and direct subsequent packets to the fast path 502. In an embodiment, the flow characterization may be a "TCP flow tuple" consisting of the IP source address, IP destination address, TCP source port, and TCP destination port.

When the firewall processes a subsequent packet belonging to the same flow, the decision logic in the fast-path processing checks 506, 508, 510 make a stateful decision and send the packet to the fast path 502 for processing. The fast path 502 then drops or passes the packet as appropriate, depending on the instructions provided by the software/firmware in the slow path 504.

The fast path logic 502 recognizes when the flow terminates and indicates this condition to both the slow path 504 and the decision logic in the fast-path processing checks 506, 508, 510. This allows both entities to remove the associated state information. When the decision logic in the fast-path processing checks 506, 508, 510 sees another packet matching the same criteria as before, the decision logic will no longer find state information saying the packet is eligible for the fast path 502.

As noted, the fast packet processing path 502 is limited in its packet processing decision making capacity by the amount of primitive operations in an instruction set contained in the fast path logic. In an embodiment, the fast path logic 502 may consists of dedicated logic, such as a FPGA or ASIC, that is able to perform the same operation efficiently on a set of packets within a given flow of related packets. Although the fast path 502 is usually very efficient, the fast path 502 typically lacks the flexibility of the software based slow path 504.

The slow packet-processing path 504 processes packets that are an exception to the primitive operations in the instruction set contained in the fast path logic. In an embodiment, the slow path logic 504 may be an general purpose processor cooperating with software or firmware to perform packet processing.

In order to offer programmability for the fast path 502 processing, the fast path processing engine can implement a set of parameterized primitive operations. In an embodiment, a primitive operation is an instruction based operation supported by the particular programming language being employed and performs an operation on the packet being processed. The slow path 502 is able to choose a list of primitive operations to execute along with the corresponding parameters specific for a recognized flow. The list of actions that are programmed for a given flow can be generated by independent sections of the slow path software, which enables a highly modular and secure framework.

Multiple decisions, such as a second fast-path processing check 508 and a third fast-path processing check 510, are required to determine whether fast path processing should be used to the process the packet. One fast-path processing check 506, 508, 510 occurs for each network element function. These decisions take time and must be performed for each function, even if all the functions elected to use fast-path processing for the packet.

Figure 6:
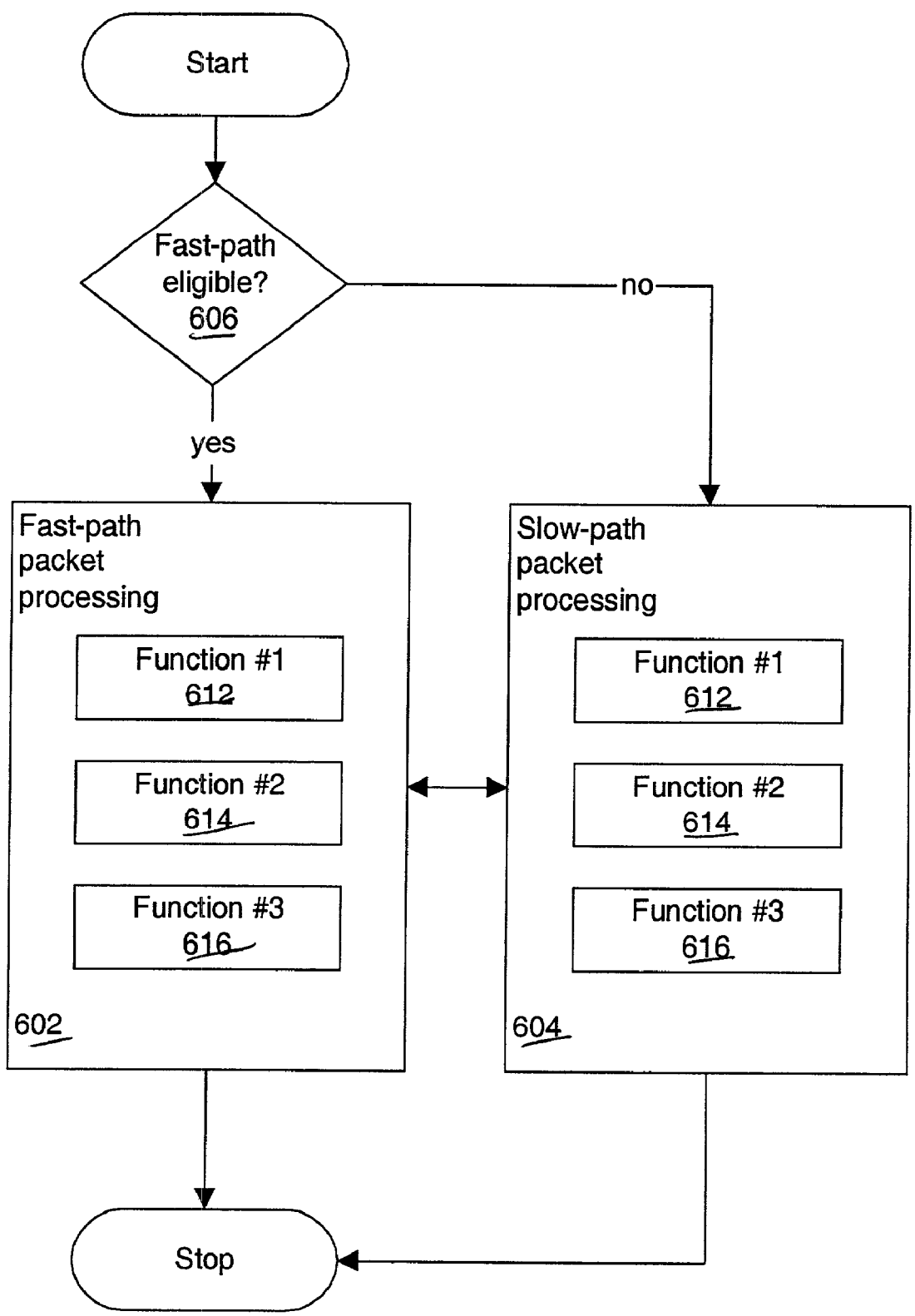
FIG. 6 illustrates a flow chart of an embodiment of a first packet processing path and a second packet processing path optimized for the state information and processing instructions generated by multiple network elements in order to increase processing performance in the fast-path architecture.

FIG. 6 illustrates a flow chart of an embodiment of a first packet processing path and a second packet processing path optimized for the state information and processing instructions generated by multiple network elements in order to increase processing performance in the fast-path architecture. In this example, decisions and operations performed on packets from three different network elements in an individual network may be optimized. The same fast path processing logic 602 processes packets from the blocks of functionality for each discrete network element in a consolidated manner. The same slow path processing logic 604 processes packets according to the blocks of functionality from each discrete network element in a consolidated manner.

The decision logic in the first fast-path processing check 606 determines whether packets should be processed on the fast path 602 or the slow path 604. If the decision logic in the first fast-path processing check 606 makes a stateful decision that the packet is eligible for fast path processing, then the packet receives fast path processing for all three blocks of functionality from the three network elements. The first block of packet processing functionality 612 from the first network element, such as the firewall Virtual-Service-Module 432, is applied to the packet. Next, the second block of packet processing functionality 614 from the second network element, such as the load balancing Virtual-Service-Module 434, is applied to the packet. Finally, the third block of packet processing functionality 616 from the third network element, such as router Virtual-Service-Module 436, is applied to the packet.

Thus, a single stateful decision is made as to whether to process the packet on the fast path 602 or the slow path 604. The slow-path logic 604 communicates to the fast-path logic 602 and all functions move from the slow path to the fast path together.

In an embodiment, the particular primitive operations that form the blocks of functionality applied by network element may be contained in three separate blocks of logic. Each block of logic, such as an ASIC, associated with a particular network element. Thus, each block of logic has its own a set of parameterized primitive operations that can be implemented by that fast path processing engine.

In an embodiment, the particular primitive operations which form the blocks of functionality applied by network element may be combined to reduce the logic and processing resources needed to process the packet through the entire topology of an individual network. Thus, a single generic block of logic has a set of parameterized primitive operations covering all the network elements that can be implemented by that fast path processing engine.

FIG. 7 illustrates a table of an exemplary list of a combined list of the amount of primitive operations in an instruction set contained within a single block of logic, such as a generic fast path processing engine. The particular primitive operations 703 which form the blocks of functionality applied by each network element may be combined and then contained within a single block of logic, such as a fast path processing engine. An exemplary list of primitive operations 703 in the instruction set 705 contained by a generic fast path processing engine may include Illegal Primitive, No Operation Check Destination MAC Address Match, Transmit the Message and End Processing, Send the Message to Slow Path and End Processing, Delete the Message and End Processing, Full IP NAT, Source IP NAT, Destination IP NAT, Full TCP/UDP PAT, Source TCP/UDP PAT, Destination TCP/UDP PAT, TCP Sequence Number Update, TCP Acknowledgement Number Update, TCP Window Size Adjust, Compare TCP Data size, Compare TCP Ack Number, Compare TCP Ack Window, Compare TCP Seq Number, Compare TCP Seq Window, Incremental IP CheckSum, Incremental TCP CheckSum, Incremental UDP CheckSum, Decrement TTL, Compare IP Header Length, Overwrite Destination MAC Address, Overwrite Source MAC Address, Overwrite Ether Type, Unsupported Primitives, Conditional primitive, i.e. IF/OR etc, and Duplicate packet. In this example, the instruction set 705 contains thirty one primitive operations.

In an embodiment, an action list may be a list of one or more of those thirty one processing primitive operations that a Virtual-Service-Module wants applied to each packet in a given related packet flow. In an embodiment, processing primitive operations 703 may be a single, primitive instruction packet transformation operation. For example, Delete the Message and End Processing and Overwrite Ether Type are each processing primitive operations. A combined action list is the concatenation of each Virtual-Service-Module's action list for all the nodes in a given sequential node list such as individual network. A common action list is a global action list applied to all arriving packets.

The action list may contain conditional primitive operations. In an embodiment, the fast path may be the default packet processing path because condition primitive operations allow for logical transfer 825 packet processing back and forth between the slow path and fast path.

Further, the action list may contain a duplicate primitive operation to duplicate a packet to create a first packet and a second packet. The original packet routes to the destination. The duplicated packet may route to a second destination, such as the opposite (slow/fast) packet processing path or a different real world destination location. For example, in debugging different output paths or different paths through an action list may be very helpful.

Figure 8:
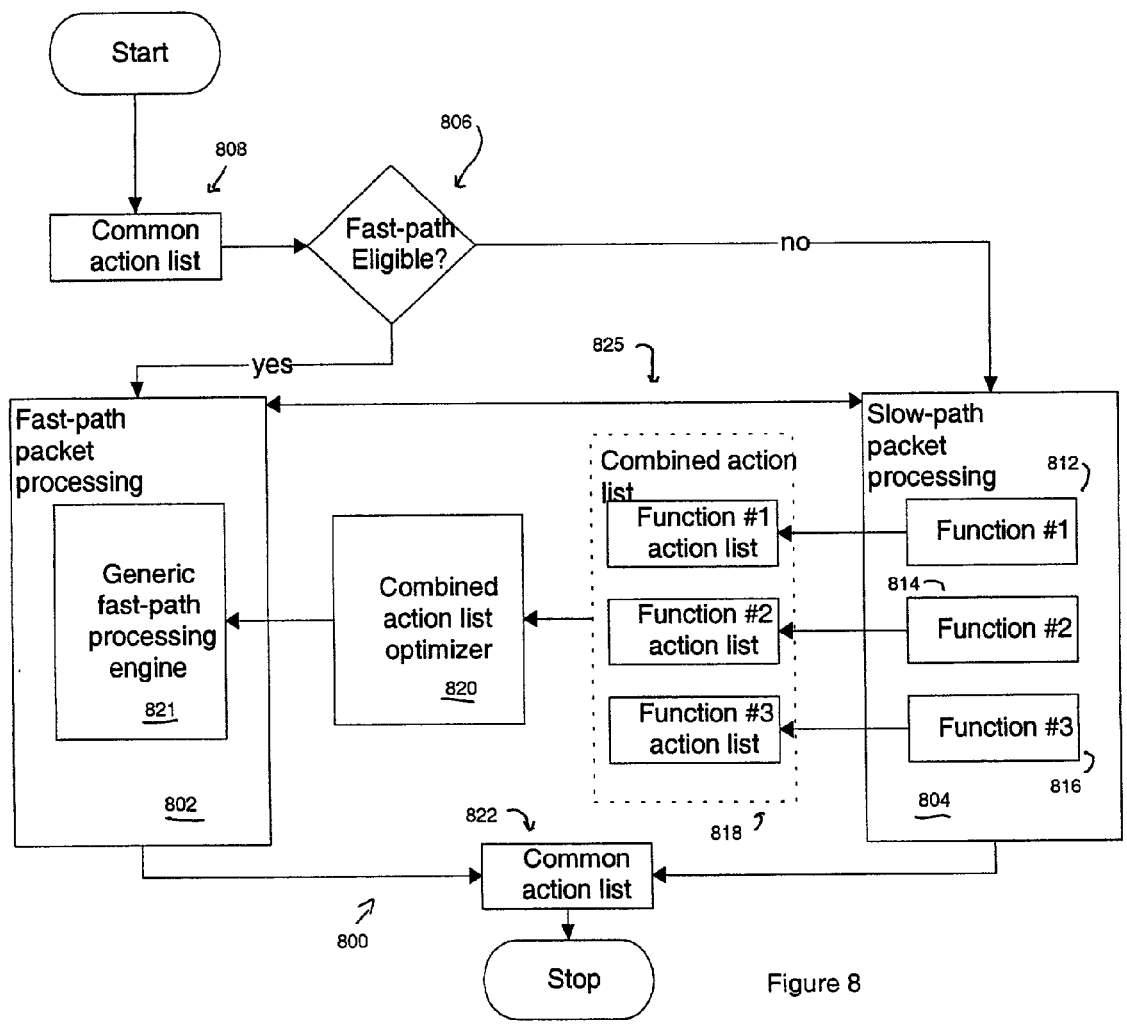
FIG. 8 illustrates a flow diagram between an embodiment of the common action list of primitive operations applied to every packet, an embodiment of the fast packet processing path, an embodiment of the slow packet processing path, and an embodiment of a combined action list optimizer.

FIG. 8 illustrates a flow diagram between an embodiment of the common action list of primitive operations applied to every packet, an embodiment of the fast packet processing path, an embodiment of the slow packet processing path, and an embodiment of a combined action list optimizer. The system 800 consists of a first common action list 808, a fast-path processing check 806, the fast packet processing path 802, the slow packet processing path 804, a function block of processing primitive operations 812, 814, 816, a combined action list 818, an combined action list optimizer 820, and a second common action list 820. The first common action list applies a generic sequence of primitive operations to every packet in order to properly process that packet. The first common action list 808 may be applied to every packet by a logic block such as the generic fast path processing engine. The fast-path processing check 806 examines state information, such as the packet belongs to a previously identified flow of packets, to determine whether the packet is eligible for fast path processing. If the packet is fast path eligible, then the optimized combined action list from all of the Virtual-Service-Modules is applied to that packet by the fast path processing engine 821.

The slow-path processing 804 is still discrete from the fast path processing 802. The fast-path functionality of executable primitive operations has been merged into a generic processing engine. The function block of processing primitive operations 812, 814, 816 includes the action list that each Virtual-Service-Module wants applied to that packet. In an embodiment, once an action list is determined for the first packet in a related flow of packet, then the action list of primitive operations to be performed to processes that packet is bound. Every packet in that related flow of packet, then receives the same set of primitive operations to process that particular packet.

The combined action list 818 is a list of all of the concatenation of each Virtual-Service-Module's action list. The combined action list optimizer 820 inserts between the point where the combined action list 818 is assembled and the fast-path processing engine 821. The combined action list optimizer 820 takes as its input the combined action list 818. The combined action list optimizer 820 applies a set of rules to combine, remove and reorder individual primitive operations from the combined action list in order to generate an optimized combined action list having fewer individual primitive operations.

The fast-path processing engine 821 operates on each packet according to the optimized combined action list from the combined action list optimizer 820 without regard for which function block 812, 814, 816 generated a particular processing operation. The generic fast-path processing engine 821 simply executes each primitive operation against the current packet. In an embodiment, the resulting generic fast-path processing engine 821 may be much smaller in size on chip by disregarding which function generated the packet processing operation. In some cases, the resulting generic fast-path processing engine 821 may also be much faster, because smaller silicon implementations typically run faster than larger implementations. In an embodiment, the fast-path processing engine 821 executes primitive operation in an action list sequentially. In an embodiment, the fast-path processing engine 821 executes primitive operation in an action list an out-of-order technique.

FIGS. 9a and 9b illustrate a table of exemplary action lists of primitive operations supplied by each Virtual-Service-Module modeling a network element. In this example, the firewall Virtual-Service-Module 432, load balancing Virtual-Service-Module 434, and router Virtual-Service-Module 436 in customer's B network 404 supply three block of functionality to the slow path. Each block of functionality contains a list of primitive operations the particular Virtual-Service-Module wants performed on that packet.

Referring to FIG. 8, each slow-path functional block 812, 814, 816 generates a list of processing instructions for the fast-path processing engine 821. Thus, the slow path 804 chooses the list of primitive operations to execute along with the corresponding parameters specific for a recognized flow. This list of processing instructions includes the action list from each Virtual-Service-Module. Each processing instruction directs the fast-path 802 to perform some operation on the current data packet. The exact list of processing instructions varies depending on the type of processing functionality that is required. In this example, the combined action list 818 as illustrated in FIG. 9 has eighteen individual primitive operations prior to being operated upon by the combined action list optimizer 820.

In an embodiment, the fast-path processing engine 821 may be implemented in software, firmware, or hardware, depending on the performance requirements of the particular implementation. In an embodiment, software designs may be much slower than hardware designs, but are much easier to implement. Even in software implementations, the fast-path processing performance limited in its decision making capacity by the amount of primitive operations in its instruction set should be much better than the more heavy weight slow-path processing. Firmware designs of the fast-path processing engine 821 composed of software executing on a specialized network processor should have performance and implementation complexity somewhere between pure software and hardware implementations. In an embodiment, the combined action list optimizer 820 may implemented in software, firmware, or hardware.

As noted, an action list may contain conditional primitive operations. In an embodiment, the fast path may be the default packet processing path because condition primitive operations allow for logical transfer 825 packet processing back and forth between the slow path and fast path.

All of the blocks of functionality 812, 814, 816 need not be bound at the same time. For example, a VSM may need information from several packets before being able to determine the exact primitive operations to be performed on that related flow of packets. A firewall VSM may need information only from the initial packet of a given related flow of packets to determine the exact primitive operations to be performed on that related flow of packets. All of the service modules that the packet progresses through forms a chain of network elements and a second network element later in sequential order in the chain of network elements can make a determination to send a packet to be processed by a packet processing component prior to a first network element earlier in sequential order in the chain of network elements makes the determination to send the packet to a particular processing component. Each new binding of an action list belonging to particular network element causes a subsequent reoptimization of the combined action list. In an embodiment, the optimization component may optimize the set of primitive operations to be performed on the packet without causing the packet processing of that packet to be reset.

FIG. 10 illustrates an a table of an exemplary list of rules the combined action list optimizer applies to combine, remove and reorder individual primitive operations in order to generate fewer individual primitive operations to process a packet through the entire network. In an embodiment, the optimization component, such as the combined action list optimizer 820, may be resident in the operating system software and checks for redundant primitive operations and other primitive operations that are made obsolete by performing a subsequent primitive. For instance, some actions can logically be combined into a single action, and other actions may be fully redundant when other primitive operations are present in the combined action list. The optimization component attempts to truncate the final amount of primitive operations performed on a packet by applying this set of rules 1009 to combined action list. In general, an optimized action list containing fewer primitive operations indicates less processing time and a consequently higher aggregate throughput for the entire processing engine.

In an embodiment, the exact optimization rules 1009 are highly dependent on the semantics of the actual primitive operations themselves. Each optimization rule 1009 ensures that the resulting optimized combined action list performs identically to the original combined action list when processed by the processing engine. In this sense, the optimization rules 1009 are very similar to the optimization rules and algorithms performed on microprocessor code by an optimizing programming language compiler.

FIG. 11 illustrates a table of exemplary of a combined action list for nodes a packet passes though that includes an exemplary list of primitive operations each node generates to process that packet. The first node 1150 is a Firewall and generates the primitive operation 1152 of "Null, once the flow is admitted." The second node 1154 is a Layer 7 SLB. The second node 1154 generates primitive operations 1156 of "TCP Splicing2b," "TCP Checksum recalculation," and "IP Checksum recalculation." The third node 1158 is a Prioritization. The third node 1158 generates primitive operations 1160 of "DiffServ code point alteration," and "IP Checksum recalculation." The fourth node 1162 is a final Router. The fourth node 1162 generates primitive operations 1164 of "IP TTL decrement," "IP Checksum recalculation," and "MAC reframing." Clearly, there are many redundant checksum recalculations and even a null operation in the sequence of low-level primitives. The sequence can be optimized to eliminate continually recalculating the IP checksum after applying each packet alteration. The combined action list 1118 has nine primitive operation being performed on the packet being processed by that sequence of nodes, such as an individual network.

FIG. 12 illustrates the optimized combined action list from FIG. 11 after being executed on by an optimization component. The optimized combined action list 1220 has six primitive operations being performed on the packet being processed by that sequence of nodes. The null operation and most of the IP checksum recalculations have been eliminated. Further, the TCP checksum calculation has been moved down toward the end of the primitive operation sequence, after all TCP/IP modifications have already happened to the packet.

Figure 13A:
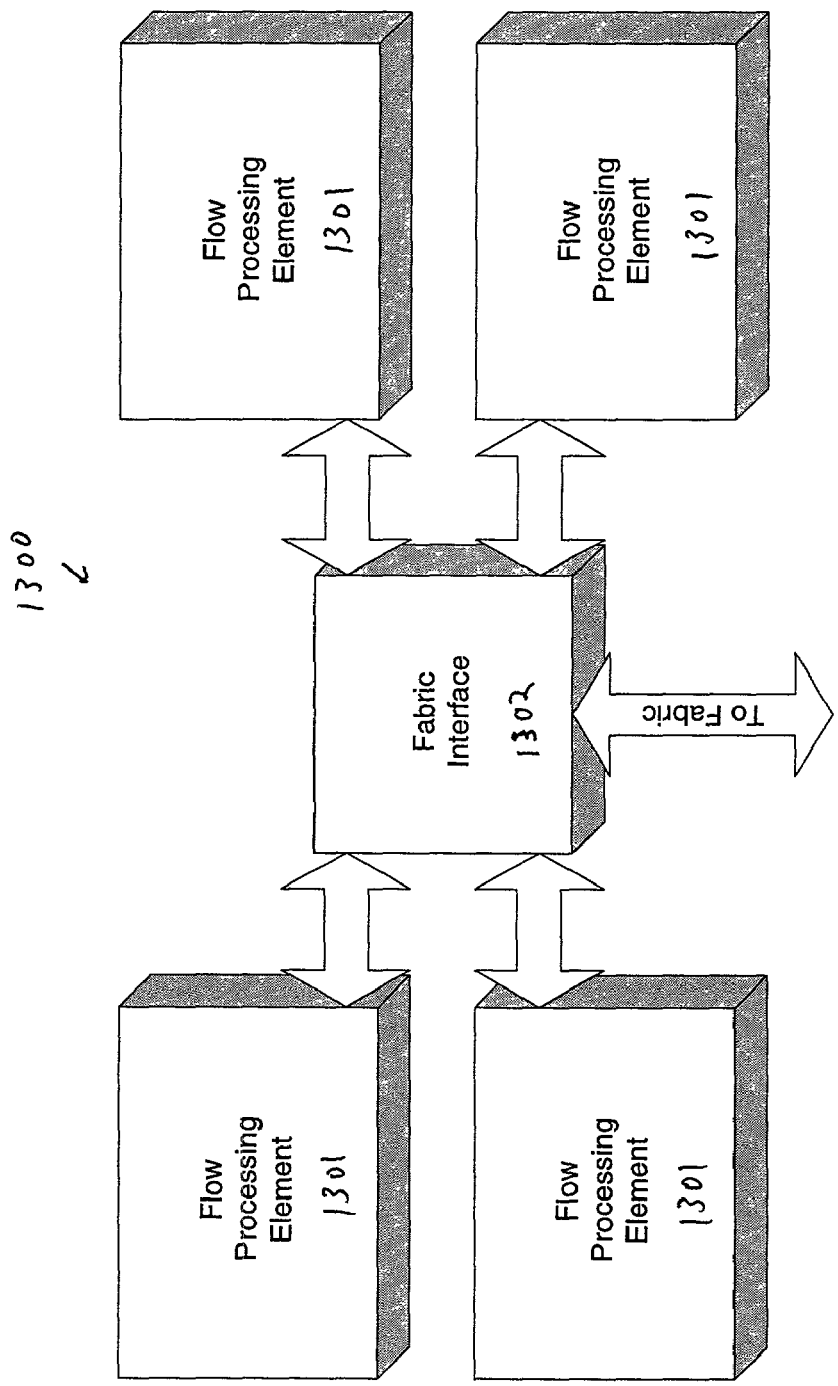
FIG. 13A shows an exemplary block diagram of an embodiment of a service processing module (SPM) to implement the fast path processing and slow path processing.

FIG. 13A shows an exemplary block diagram of an embodiment of a service processing module (SPM) to implement the fast path processing and slow path processing. The SPM implements the packet processing for the system. Referring to FIG. 13A, an SPM contains one or more Service Processing Elements (SPE) 1301. All of the SPEs are coupled through the fabric interface 1302 to the fabric switches, which may be connected to other components of the system. Each SPE may consist of a general processor computer, such as a PowerPC, a hardware acceleration device, such as ASIC, and an optional cryptographic acceleration device. The packet processing is divided into two main categories: fast-path which is implemented through the hardware acceleration device, and slow-path which is implemented through the general processor computer, such as PowerPC.

The fast-path for packet processing is designed to be simple and fast, and packets in recognized flows that require simple processing should be handled without using the general computer (e.g., PowerPC). For slow-path packets, the hardware acceleration device (e.g., the ASIC) can assist the PowerPC by performing packet parsing and other low-level primitives for most packets. The packet headers and data will be placed in the PowerPC's memory.

Figure 13B:
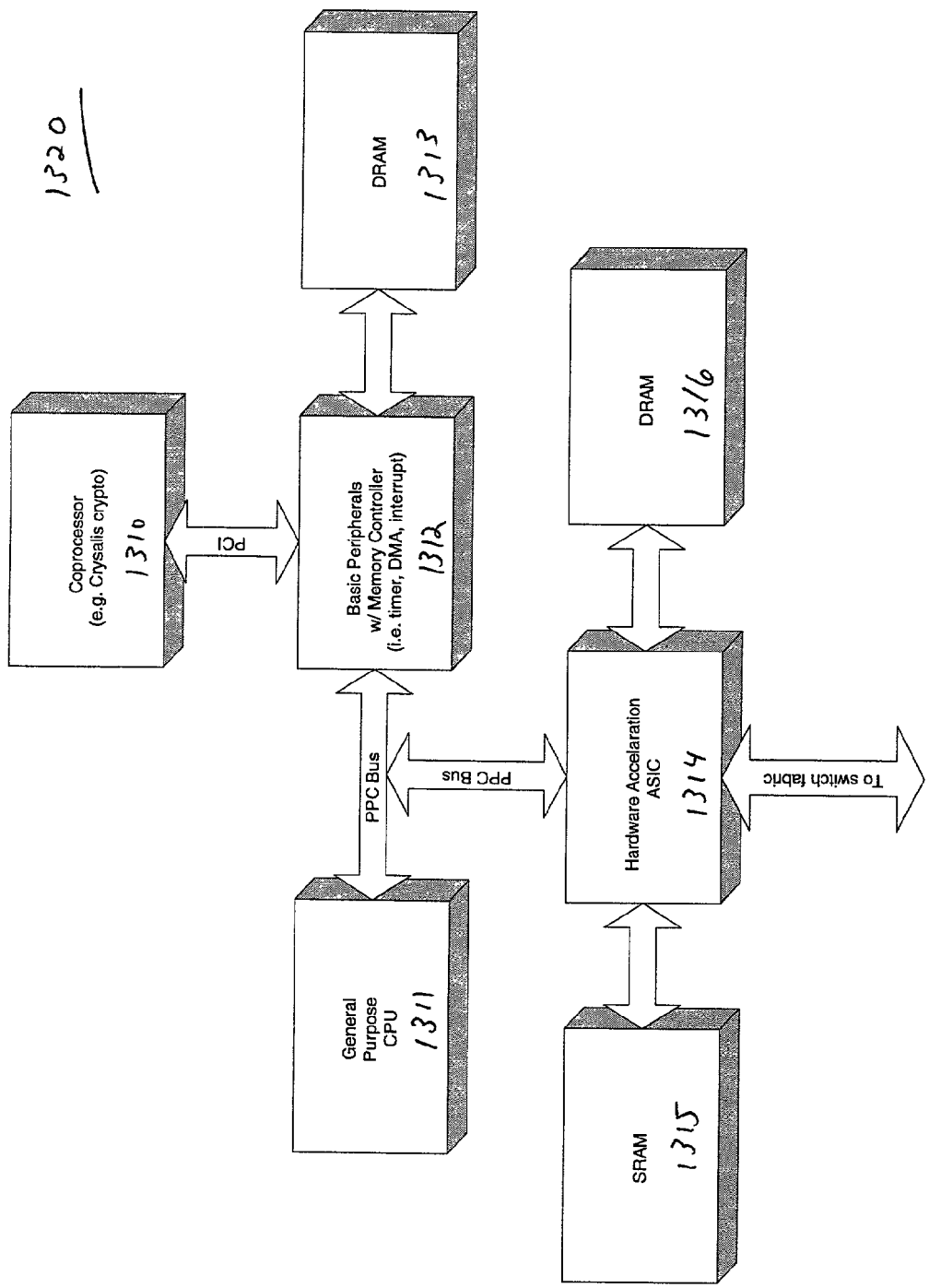
FIG. 13B shows an exemplary block diagram of an SPM, according to an alternative embodiment of the invention.

FIG. 13B shows an exemplary block diagram of an SPM, according to an alternative embodiment of the invention. The SPM includes a general purpose central processing unit (CPU) 1311, basic peripherals 1312 such as a north bridge (e.g., memory controller), a hardware acceleration device 1314, optional coprocessor such as cryptographic device 1310, and other memory such as static random access memory (SRAM) 1315 and dynamic random access memory (DRAM) 1313 and 1316. In one embodiment, the general purpose CPU is a PowerPC processor, such as PPC 7400, from Motorola, Inc. Other types of CPU may be utilized. In one embodiment, the hardware acceleration device 1314 may be implemented as an ASIC.

The PowerPC is responsible for receiving at least the first packet of a new flow and determining how the flow should be handled. Software running on the PowerPC determines which services should be applied to the new flow, and which, if any, fast-path operations should be used to handle further packets belonging to the flow.

The hardware acceleration device 1314 contains the fabric interface, the fast-path packet processing, and the slow-path interface to the PowerPC. The fabric interface implements the segmentation and reassembly required to send packets across the cell-based switch fabric. The fast-path implements a set of primitives such as full and half network address translation (NAT), transportation control protocol (TCP) connection splicing, and internet protocol (IP) checksum recalculation, that are programmed for each flow that is placed on the fast-path. The slow-path interface is a PPC bus master that enables full access to the PowerPC DRAM. The hardware acceleration device also performs packet queuing per customer with token-based rate control. The PowerPC uses the switch fabric and a message passing protocol to communicate with I/O Modules, Management Modules, and other SPEs.

Figure 13C:
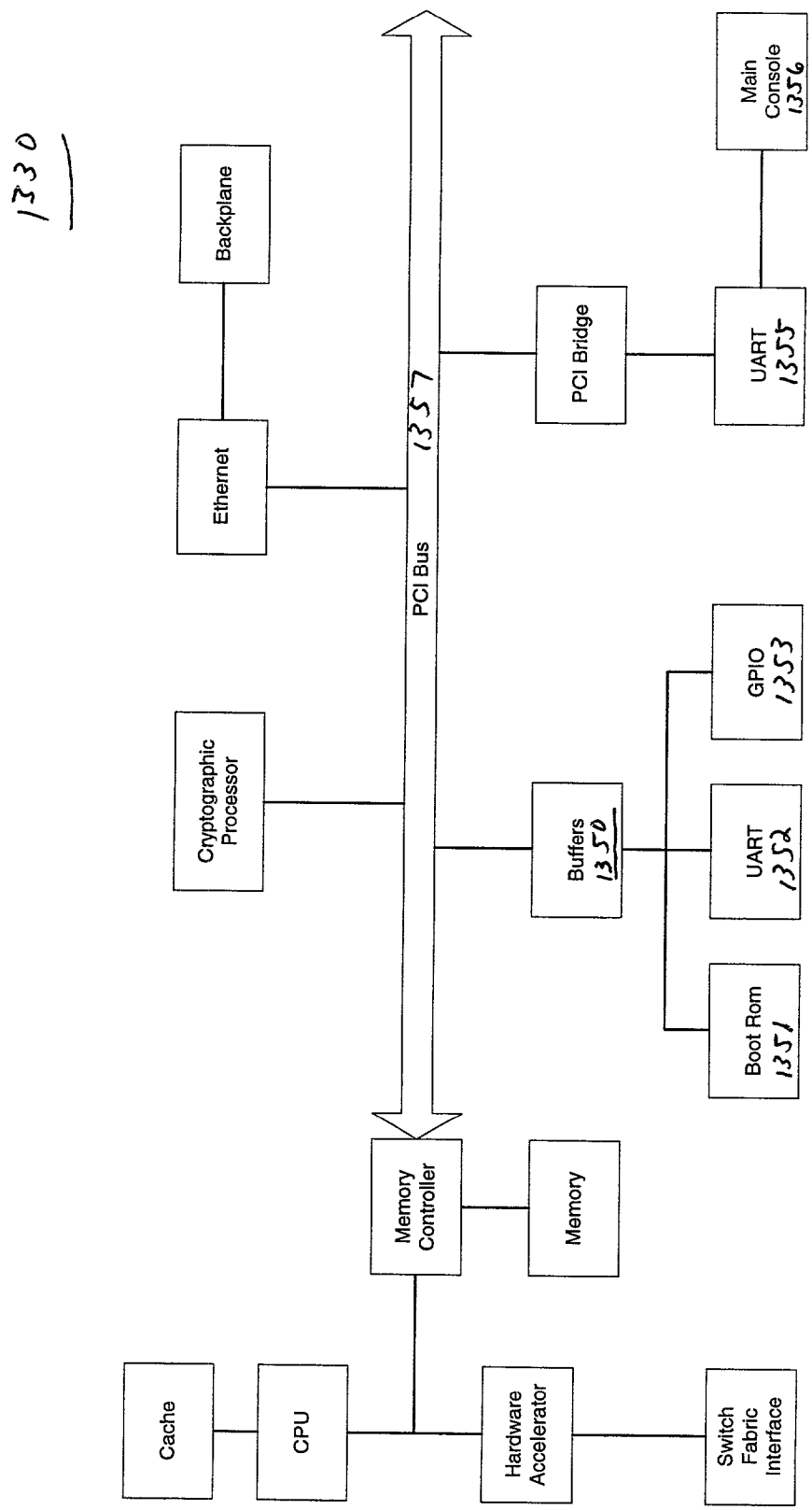
FIG. 13C shows an exemplary block diagram of an SPM, according to yet another alternative embodiment of the invention.

FIG. 13C shows an exemplary block diagram of an SPM, according to yet another alternative embodiment of the invention. In addition to the one shown in FIG. 13B, this embodiment also includes buffers 1350 coupled to the peripheral component interface (PCI) bus 1357. The buffers 1350 may be used by the boot read only memory (ROM) 1351 for initialization, by a universal asynchronous receiver/transmitter (UART) 1352 for debug purpose, or by a general purpose input/output (GPIO) 1353. Furthermore, the SPM may include another UART 1355 coupled to the PCI bus through the PCI bridge 1354. The UART 1355 provides data to a remote terminal such as main console 1356.

Each flow of packets should have a sibling flow of response packets that flows in the opposite direction. These two flows are called the forward path and the reverse path. Whichever direction initiates the connection is called the forward path. The state information for these two flows is stored in a session context that is shared by the forward and reverse paths. The session context and flow entries (forward and reverse) are combined into a connection record. The flow entries are referenced directly within the flow lookup mechanism, but they are tied to the session context within the connection record.

Even after a Virtual-Service-Module has bound an action list, the flow set-up component of the Virtual-Service-Module can handle exception conditions reported from the action list in order to handle the more complicated processing sometimes required for infrequent events.

Figure 14:
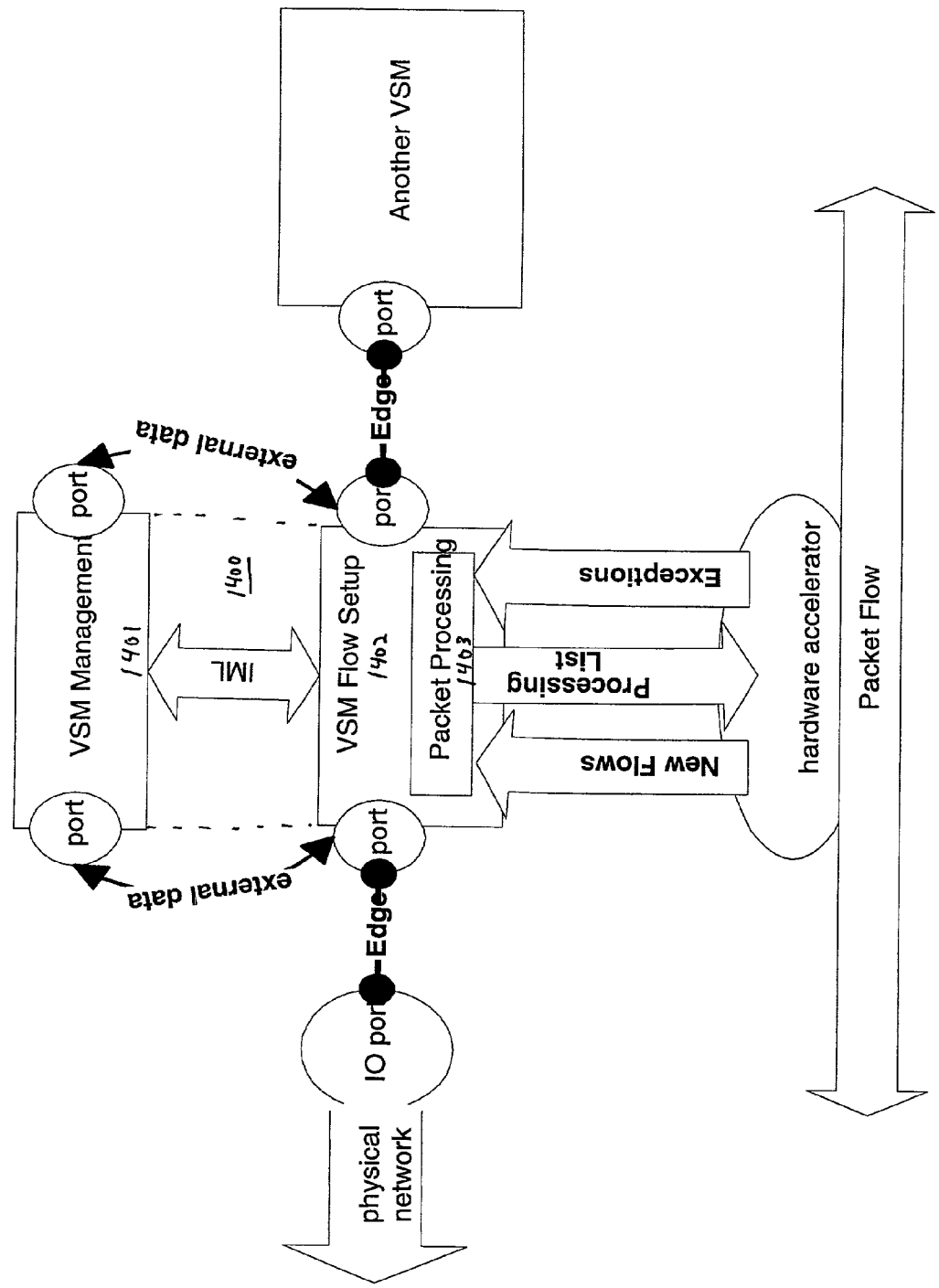
FIG. 14 illustrates an embodiment of an architecture of a Virtual-Service-Module modeled to represent a network element that performs one or more functions to process a packet in a network system.

FIG. 14 illustrates an embodiment of an architecture of a Virtual-Service-Module modeled to represent a network element that performs one or more functions to process a packet in a network system. The architecture of an instance of a Virtual-Service-Module 1400 may be composed of multiple cooperating parts. In this way, a Virtual-Service-Module 1400 is actually a high-level abstraction composed of multiple sub-parts. The sub-components include a Management component 1401, a Flow setup component 1402, and a Packet-processing component 1403. Each Virtual-Service-Module instance 1400 also may have ports that describe its relation to other components and have interfaces to communicate with components external to the virtual network system. The ports are used by both the management component 1401 and the flow setup component 1402.

The management component 1401 directs interfacing with the various management interfaces common to the components internal to the virtual system. The management component 1401 also maintains any global information required. The management component 1401 gathers information by communicating with external entities such as routers and authentication authorities.

The flow setup component 1402 performs initial packet-processing, determining the packet path through the virtual network graph, and building an action list for the flow. Flow may be a particular stream of related packets. For example, the stream of data a server sends to a client over a particular TCP connection is a flow of related packets.

The packet-processing component 1403 is an abstract piece of the Virtual-Service-Module 1400. The packet-processing component 1403 may contain an action list of standard processing primitive instructions programmed into a hardware accelerator application specific integrated circuit. A Virtual-Service-Module that requires packet processing beyond what the standard primitive instructions in the packet-processing component 1403 can accomplish would continue to process the packets in the flow set-up processing component 1402. A Virtual-Service-Module that starts each related packet flow as this type of extended flow setup can bind an action list at any time, but in some cases the Virtual-Service-Module processes the entire related packet flow without ever switching to hardware assist.

In an alternative embodiment, each VSM component may be contained in a in single container application, just as long as the service module is modeled to represent a network element.

Figure 15:
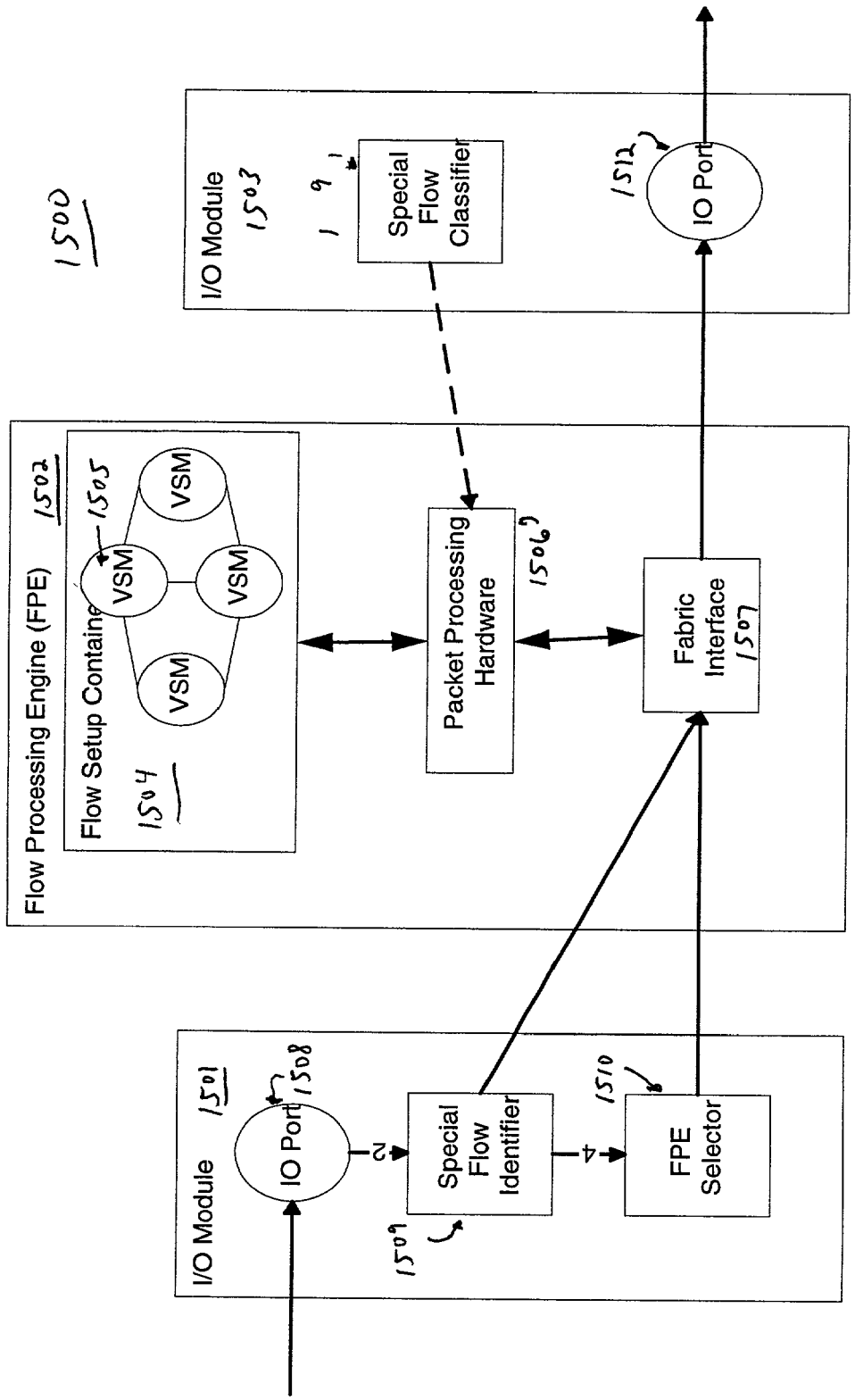
FIG. 15 shows an exemplary flow setup processing diagram according to one embodiment of the invention.

FIG. 15 shows an exemplary flow setup processing diagram according to one embodiment of the invention. In one embodiment, the system 1500 includes an I/O module 1501, a service processing module (e.g., flow processing module) 1502, and another I/O module 1503. The SPM 1502 includes a flow setup container 1504, which may include multiple VSMs 1505, a packet processing hardware 1506, and a fabric interface 1507. The I/O module 1501 includes an I/O port 1508, a special flow identifier 1509, and a service processing element selector 1510. The I/O module 1503 includes a special flow classifier 1511 and an I/O port 1512.

Referring to FIG. 15, in one embodiment, the packet arrives at the input port (e.g., I/O port 1508) at the I/O module 1501. The packet is passed to the special flow identifier 1509 assigned to handle traffic from that particular port. Typically, the I/O module 1501 is not aware of specific flows and does not find a match in its tables, but when the flow identifier 1509 does find the specific flow, it forwards the packet directly to the indicated SPE. If a special flow was not found, the packet is handed off to the SPE selector 1510 for SPE selection.

SPE selector 1510 selects an SPE by applying an algorithm to the packet's addressing information such that it evenly distributes flows among the SPEs in the system. The algorithm always selects the same SPE for the same flow. The I/O module 1501 then sends the packet to the selected SPE through the system's switch fabric 1507.

The SPE's fabric interface 1507 delivers the packet to the packet-processing hardware 1506 where the common action list is applied to it. For a new flow or one that is not entirely bound, the packet-processing hardware 1506 does what it can and then passes the packet to the flow setup container 1504.

For a previously unrecognized flow, the flow setup container 1504 determines the path of the packet through the virtual network graph. As VSMs on the flow path bind (i.e., produce action lists), the flow setup container 1504 instructs the local packet-processing hardware 1506 how to handle the subsequent packets of the flow. The flow setup container 1504 gives the packet-processing hardware the combined action list for the parts of the flow that are bound. Once all the VSMs bind, flow setup will optimize the final combined action list, after which the flow will be handled entirely by the hardware acceleration hardware 1506. Not all flows, however, will have all VSMs bind, meaning that at least some part of the packet processing has to be handled by the more sophisticated yet slower flow setup software.

Once the packet has been processed, whether by hardware (e.g., the fast path) or software (e.g., the slow path) or a combination of both, the packet-processing hardware 1506 passes it back to the SPE's fabric interface 1507. The fabric interface 1507 transmits the packet over the fabric to the correct I/O port, such as I/O port 1512, on the outbound I/O Module 1503.

The special flow identifier 1509 monitors outbound packets and recognizes the special case where returning packets will not automatically be sent to the SPE handling the flow. In that case, it adds the flow and the destination SPE to its special flow list. When a packet on the reverse flow arrives, it will be forwarded to the SPE handling the forward flow. At the egress I/O port, the I/O module strips off all the associated internal fabric routing information and sends the packet out on the wire.

In some cases, in order to make a service decision, a VSM may require information that is not present in the first packet of the flow. In these cases, the VSM cannot create low-level processing functionality to be executed by the fast-path until it has resolved the high-level dependency. This process is called "late binding" because the flow path through the VSM chain graph cannot be resolved, or bound, until later in the flow lifecycle. In other case, any flow providing that feature will never be entirely bound, and part of the flow will always be handled by the flow setup component of the feature's VSM.

Different VSMs may make binding decisions at different points in the flow lifecycle. For example, a firewall VSM doing simple port-level filtering can make a very early binding decision. It decides whether to admit the flow or not based on the TCP port number in the first packet.

To achieve hardware acceleration even in the face of late binding, in one embodiment, each packet of each flow is processed as much as possible by any action lists bound by the leading VSMs in the sequential node list. Packets are always processed through at least the default action list that the hardware accelerators apply to all packets. As VSMs at the beginning of the sequential node list bind action lists, the hardware acceleration will do more and more of the processing. After the initial bound action list processing is completed, the packet will be passed to the general purpose processor (GPP) for further processing, starting with the first unbound VSM in the sequential node list. Alternatively, software running in the GPP can execute action lists bound by VSMs that follow the first unbound VSM. This allows a VSM to bind at any time, but its action list will be simulated in software until all the earlier VSMs have also bound.

Figure 16:
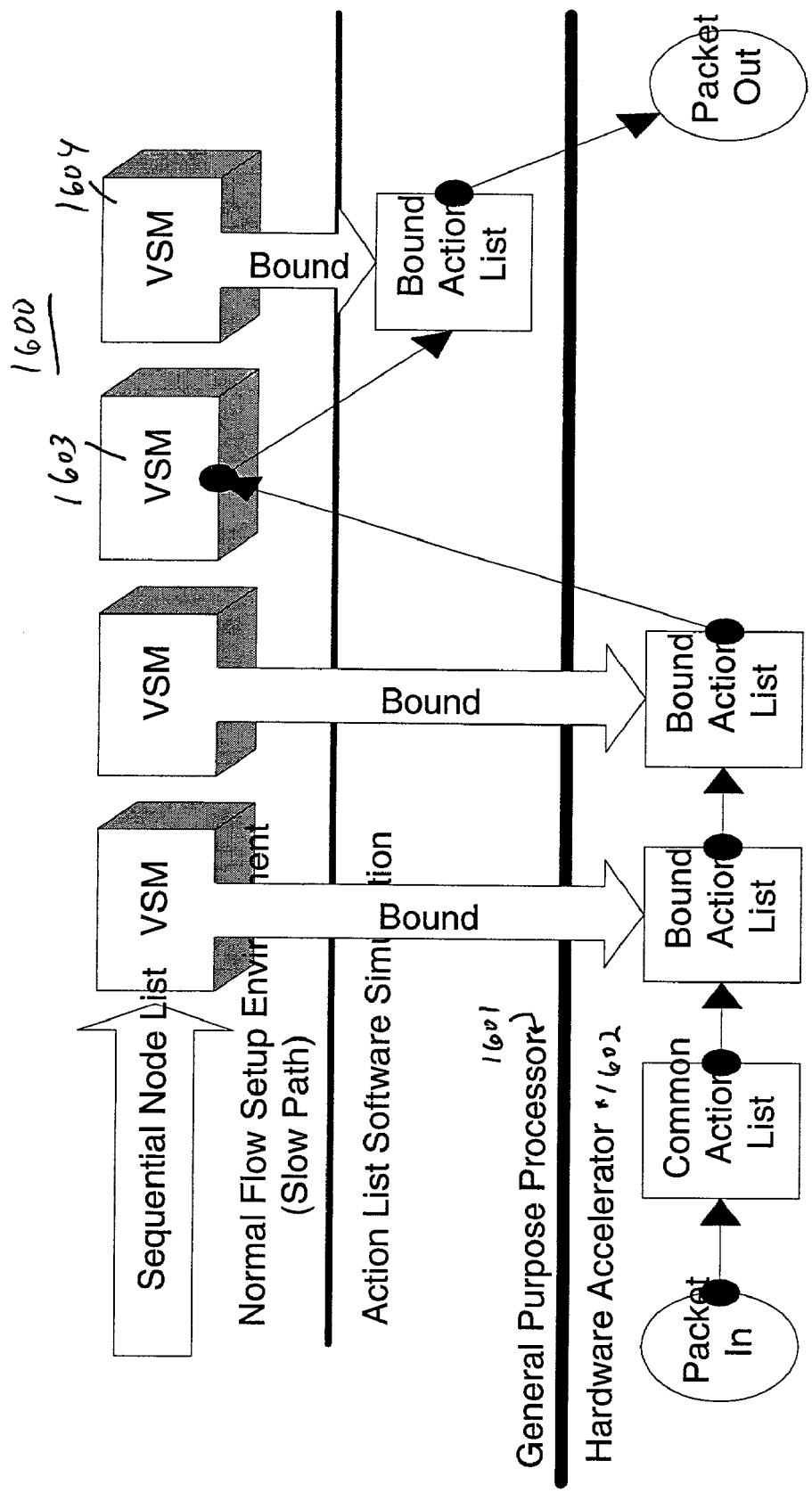
FIG. 16 shows an exemplary action list processing diagram according to an embodiment of the invention.

FIG. 16 shows an exemplary action list processing diagram according to an embodiment of the invention. In one embodiment, the system 1600 includes a GPP 1601 that constitutes a slow path and a hardware accelerator 1602 that constitutes a fast path. Hardware accelerator 1602 as far as possible handles each packet, but once an unbound VSM (e.g., VSM 1603) is encountered, the accelerator 1602 forwards it to the GPP 1601 for further processing. Once a packet is passed to the GPP 1601, its processing remains there even if subsequent VSMs (e.g., VSM 1604) are bound. This allows the system to avoid the complicated and expensive problem of moving a packet back down to the hardware layer when it is only partially processed, yet still allows VSMs to bind whenever they want without needing to know whether their actions are being performed by hardware or simulated in software. The action lists could be combined and optimized as soon as they are chained together or after all of the VSM's have bound their action list.

In one embodiment, the software used to facilitate the algorithms can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. The invention is to be understood as not limited by the specific embodiments described herein, but only by scope of the appended claims.

We claim:

1. A network system, comprising:
    a virtual graph that includes a plurality of service modules, a first service module modeled to represent a network element, the first service module to initiate one or more primitive operations to be performed on a packet in order to process the packet;
    a first packet processing path limited in its decision making capacity by the amount of primitive operations in an instruction set;
    a second packet-processing path that processes packets that are an exception to the primitive operations in the instruction set;
    a stateful decision logic to determine if the packet to be processed is eligible be processed by the first packet processing path or required to processed by another packet processing path; and
    an optimization component to optimize an amount of primitive operations performed on the packet by removing redundant primitive operations and other primitive operations that are made obsolete by performing a subsequent primitive operation.

2. The network system of claim 1, wherein each service module that the packet progresses through in the virtual graph initiates one or more primitive operations to be performed on the packet.

3. The network system of claim 1, wherein the optimization component optimizes a total set of the primitive operations contributed by all of the service modules that the packet progresses through.

4. The network system of claim 1, wherein the optimization component resides in operating system software.

5. The network system of claim 1, wherein the optimization component implements in firmware.

6. The network system of claim 1, wherein the optimization component is a hardware block of logic.

7. The network system of claim 1, wherein the optimization component applies a set of rules to the total set of the primitive operations in order to optimize that set of the primitive operations.

8. The network system of claim 1, wherein the stateful decision logic determines if the packet belongs to a particular flow of packets previously identified by the stateful decision logic.

9. The network system of claim 1, wherein the first packet-processing path further comprises dedicated logic to perform packet-processing operations with the limited instruction set.

10. The network of claim 1, wherein the first packet-processing path executes a total set of primitive operations on the packet, the total set of primitive operations coming from all of the service modules in an individual network.

11. The network system of claim 1, wherein the second packet processing path further comprises a general purpose processor cooperating with software.

12. The network system of claim 1, further comprising:
    a component to execute a common set of primitive operations to every packet prior to the first packet processing path or second packet processing path processing the packet.

* * * * *